United States Patent Office 2,782,205
Patented Feb. 19, 1957

2,782,205
IMIDAZOLE DERIVATIVES

Arthur F. McKay, Pointe Claire, Quebec, and David L. Garmaise, Montreal, Quebec, Canada, assignors to Monsanto Canada Limited, La Salle, Quebec, Canada, a body politic and corporate No Drawing. Application March 29, 1956,
Serial No. 574,588

7 Claims. (Cl. 260—309.6)

The present invention relates to 1-substituted-2,3,5,6-tetrahydro-1-imidaz (1,2-a) imidazoles and their salts and to a process for their preparation.

The products of the present invention correspond to the general formula

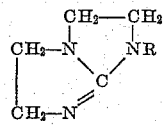

wherein R stands for a radical selected from the group consisting of an alkyl radical having from 1 to 20 carbon atoms, an aralkyl radical and a diloweralkylaminoloweralkyl radical.

The products of the present invention are prepared by refluxing a 1-($\beta$-hydroxyethyl)-2-substituted amino-2-imidazoline (I) of the formula.

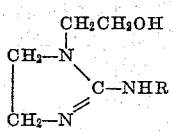

with thionyl chloride in the presence of an inert solvent. After removal of the excess thionyl chloride and solvent, the residue consisting of crude 1-($\beta$-chloroethyl)-2-(substituted amino)-2-imidazolinium chloride (II) is then refluxed with an alcoholic solution of an alkali metal hydroxide, preferably sodium or potassium hydroxide. The precipitated sodium or potassium chloride is removed by filtration or other suitable means, and the desired 1-substituted-2,3,5,6-tetrahydro-1-imidaz (1,2-a) imidazole (III) is isolated by evaporating the filtrate to dryness and extracting the residue with a solvent, for example, ether.

The overall reactions involved can be illustrated by the following flow sheet:

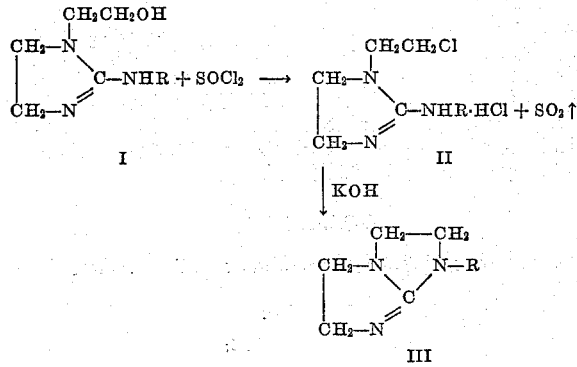

The products of the present invention wherein R stands for a long chain alkyl radical having from 10 to 20 carbon atoms have desirable surface-active properties. Besides the surface-active properties just mentioned when R is an aralkyl the products possess rodenticidal properties.

For example, the 1-benzyl-2,3,5,6-tetrahydro-1-imidaz (1,2-a) imidazole has a $LD_{50}$ of 26 mg./kg.

The compounds in which R represents a dialkyl-aminoalkyl group are useful as intermediates in the preparation of biologically active compounds. For example, a derivative of 1-dimethylaminoethyl-2,3,5,6-tetrahydro-1-imidaz (1,2-a) imidazole has potentiating effect on barbiturates. This product is also effective in lowering blood pressure. It is formed by the methylation of 1-dimethylaminoethyl-2,3,5,6-tetrahydro-1-imidaz- (1,2-a) imidazole. Its dihydroiodide salt melts at 234–236° C.

The starting 1-($\beta$-hydroxyethyl)-2-substituted amino-2-imidazoline can be obtained by the means disclosed in U. S. application S. N. 566,357.

The present invention will be more fully understood by referring to the following examples which are given to illustrate the invention rather than to limit the scope of the invention.

EXAMPLE I 1-($\gamma$-dimethylaminopropyl)-2,3,5,6-tetrahydro-1-imidaz (1,2-a) imidazole

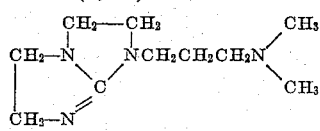

A solution of 30 parts by weight of thionyl chloride in 50 parts of chloroform was added dropwise to a mechanically stirred solution of 21.4 parts of 1-($\beta$-hydroxyethyl)-2-($\gamma$-dimethylaminopropylamino)-2-imidazoline in 50 parts of chloroform under anhydrous conditions. During the addition period, the temperature was maintained at 0° C. after which the reaction mixture was refluxed for three hours. After removal of the chloroform and excess thionyl chloride in vacuo, the residue was dissolved in 75 parts of methanol. To this methanolic solution was added a solution of 19 parts of potassium hydroxide in 125 parts of methanol and the whole was refluxed for a period of three hours. The potassium chloride was removed by filtration and the filtrate evaporated to dryness. The residue was extracted with absolute ether (3 x 100 parts) and the ether removed from the combined ethereal extracts by evaporation. This residue (B. P. 117–119° C./0.25 mm.) was distilled in vacuo, yield 10.3 parts by weight. Analysis of the new compound gave 61.01% carbon and 10.26% hydrogen, compared with the theoretical calculated for $C_{10}H_{20}N_4$ of 61.17% carbon and 10.27% hydrogen.

Its dipicrate salt prepared in the usual manner melted at 157–158° C. Analysis of this compound gave 40.10% carbon and 4.13% hydrogen, compared with the theoretical calculated for $C_{22}H_{26}N_{10}O_{16}$ of 40.36% carbon and 4.00% hydrogen.

EXAMPLE II 1-($\gamma$-diethylaminopropyl)-2,3,5,6-tetrahydro-1-imidaz (1,2-a) imidazole

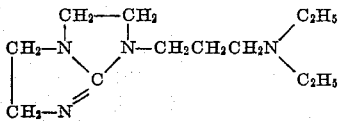

A solution of 27 parts of 1-($\beta$-hydroxyethyl)-2-($\gamma$-diethylamino-propylamino)-2-imidazoline in 125 parts of chloroform was mechanically stirred and maintained at a temperature of 10–15° C. while a solution of 30 parts of thionyl chloride in 125 parts of chloroform was added dropwise. The resulting solution was refluxed for four hours after which the solvent and excess thionyl chloride were removed by distillation. The residue was dissolved in a methanolic (100 parts) solution of sodium hydroxide (14 parts) and then refluxed for three hours. After removal of the sodium chloride by filtration, the filtrate was evaporated in vacuo to remove the methonal. The residual oil (B. P. 121–123° C./0.20 mm.) was fractionated in vacuo. Analysis of this new compound gave 24.7% nitrogen, compared with the theoretical calculated for $C_{12}H_{24}N_4$ of 24.98%.

Its dipicrate salt melted at 138–140° C. Analysis of this dipicrate salt gave 20.4% nitrogen, compared with the theoretical calculated for $C_{24}H_{30}N_{10}O_{14}$ of 20.50%.

EXAMPLE III

*1-benzyl-2,3,5,6-tetrahydro-1-imidaz (1,2-a) imidazole*

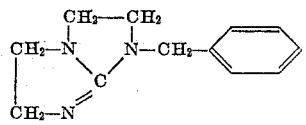

Thionyl chloride (14 parts by weight) was added dropwise to a solution of 16 parts of 1-(β-hydroxyethyl-2-benzylamino-2-imidazolinium chloride in 50 parts of chloroform at room temperature. This solution was refluxed for three hours and then the solvent and excess thionyl chloride were removed by evaporating leaving a reddish oil. A small sample of this oil gave a picrate (M. P. 137–138° C.) which on analysis gave 18.24% nitrogen. The theoretical analysis calculated for the picrate of 1-(β-chloroethyl)-2-benzylamino-2-imidazoline is 18.00% nitrogen.

The reddish oil was refluxed for two hours in a solution of 10 parts of potassium hydroxide in 150 parts of methanol. After removal of the potassium chloride by filtration and removal of the methanol by evaporation, the residue was extracted with ether (2 x 50 parts). Distillation of the residue from the ether gave 8.8 parts (70%) of oil (B. P. 124–126° C./0.1 mm.) which solidified on standing. The white crystalline solid melted at 39–40.5° C. Analysis of this new compound, 1-benzyl-2,3,5,6-tetrahydro-1-imidaz (1,2-a) imidazole, gave 20.70% nitrogen, compared with the theoretical calculated for $C_{12}H_{15}N_3$ of 20.87% nitrogen.

Its picrate salt was dimorphic melting at 109–109.5° C. and 123–124° C. Analysis of this picrate salt gave 19.7% nitrogen, compared with the theoretical calculated for $C_{18}H_{18}N_6O_7$ of 19.54%.

EXAMPLE IV

*1-(β-dimethylaminoethyl)-2,3,5,6-tetrahydro-1-imidaz (1,2-a) imidazole*

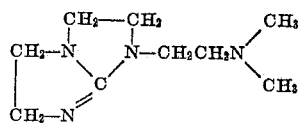

1-(β-hydroxyethyl)-2 - (β-dimethylaminoethylamino)-2-imidazoline (31.6 parts by weight) was converted into its hydrochloride salt by addition of an equivalent of methanolic hydrogen chloride. The solution was evaporated to dryness and the residue (43.3 parts) was refluxed for three hours with 26 parts of thionyl chloride in 150 parts of carbon tetrachloride. After removal of the solvent, the residue was refluxed in the presence of 140 parts of 3.58 N alcoholic potassium hydroxide solution. The potassium chloride was removed and the filtrate evaporated to dryness. This residue was extracted with ether (4 x 50 parts) and the ethereal extracts evaporated. Fractional distillation of the residue gave a colorless oil (B. P. 91–92° C./0.05 mm.). Analysis of this new compound gave 59.22% carbon and 9.88% hydrogen compared with the calculated for $C_9H_{18}N_4$ of 59.29% carbon and 9.95% hydrogen.

Its dipicrate, formed in the usual manner, melted at 172–173° C. This picrate on analysis gave 22.20% nitrogen compared with the calculated for $C_{21}H_{24}N_{10}O_{14}$ of 21.87% nitrogen.

EXAMPLE V

*1-(β-diethylaminoethyl)-2,3,5,6-tetrahydro-1-imidaz (1,2-a) imidazole*

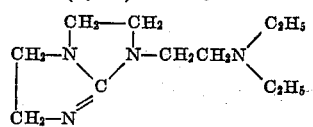

1-(β-hydroxyethyl) - 2 - (β-diethylaminoethylamino)-2-imidazoline (24.4 parts) was dissolved in 50 parts of alcohol containing 12 parts by volume of concentrated hydrochloric acid solution. After removal of the solvent by evaporation, the residue was dissolved in 294 parts of chloroform and then treated with 23.8 parts of thionyl chloride. This solution was refluxed for three hours after which the solvent and excess thionyl chloride were removed by evaporation. The oily residue of crude 1-(β-chloroethyl)-2-(β-diethylaminoethylamino) - 2 - imidazoline dihydrochloride gave a picrate which melted at 147–148° C. The residual oil (36.6 parts) was treated with 277 parts by volume of 1.23 N potassium hydroxide solution in absolute alcohol and then refluxed for three hours. After the precipitated potassium chloride was removed by filtration, the filtrate was evaporated to dryness. The residual oil (B. P. 100–102° C./0.05 mm.) gave a dipicrate salt which melted at 172–173° C. after two crystallizations from alcohol. This picrate of 1-(β-diethylamino ethyl)-2,3,5,6-tetrahydro-1-imidaz (1,2-a) imidazole on analysis gave 41.33% carbon, 4.26% hydrogen and 21.39% nitrogen compared with the calculated for $C_{23}H_{28}N_{10}O_{14}$ of 41.30% carbon, 4.22% hydrogen and 20.95% nitrogen.

EXAMPLE VI

*1-(β-phenylethyl)-2,3,5,6-tetrahydro-1-imidaz (1,2-a) imidazole*

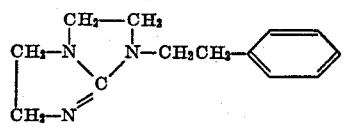

1 - (β - hydroxyethyl) - 2 - (β - phenylethyl) - 2-imidazolinium chloride (44 parts) in solution in 220 parts of chloroform was treated with 39.3 parts of thionyl chloride. This solution was refluxed for three hours after which the solvent and excess thionyl chloride were removed by evaporation. The residue (48 parts) was refluxed in 387 parts of a 0.34 M absolute ethanolic solution of potassium hydroxide for three hours. After the precipitated potassium chloride was removed, the filtrate was evaporated to dryness and the residue was extracted with ether. Evaporation of the ether gave 24 parts of oil. The oil (B. P. 122–124° C./0.05 mm.) was distilled. This new compound on analysis gave 72.34% carbon, 8.29% hydrogen and 19.99% nitrogen compared with the calculated for $C_{13}H_{17}N_3$ of 72.53% carbon, 7.96% hydrogen and 19.52% nitrogen. Its picrate (M. P. 145–146° C.) on analysis gave 51.61% carbon, 4.76% hydrogen and 19.11% nitrogen compared with the theoretical calculated for $C_{19}H_{20}N_6O_7$ of 51.35% carbon, 4.54% hydrogen and 18.92% nitrogen.

EXAMPLE VII

*1-n-propyl-2,3,5,6-tetrahydro-1-imidaz (1,2-a) imidazole*

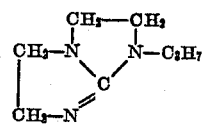

1 - (β - hydroxyethyl) - 2 - n - propylamino - 2-imidazolinium chloride (37 parts) was refluxed in chloroform (150 parts) with 47.6 parts of thionyl chloride for three hours. After removal of the solvent and excess thionyl chloride by evaporation, the residue was refluxed with a 0.4 molar absolute ethanol solution of potassium hydroxide (425 parts). The precipitated potassium chloride was removed by filtration and the residue remaining after evaporation of the filtrate was extracted with ether (400 parts). Evaporation of the ether gave an overall 66.4% yield of 1-n-propyl- 2,3,5,6-tetrahydro-1-imidaz (1,2-a) imidazole (B. P. 86–88° C./0.15 mm.). This new compound on analysis gave 62.47% carbon, 9.74% hydrogen and 27.10% nitrogen compared with the calculated for $C_8H_{15}N_3$ of 62.70% carbon, 9.87% hydrogen and 27.42% nitrogen. Its picrate (M. P. 85–86° C.) on analysis gave 44.11% carbon, 4.75% hydrogen and 22.20% nitrogen compared with the calculated for $C_{14}H_{18}N_6O_7$ of 43.98% carbon, 4.74% hydrogen and 21.98% nitrogen.

EXAMPLE VIII

*1-n-octyl-2,3,5,6-tetrahydro-1-imidaz (1,2-a) imidazole*

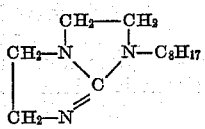

1 - (β - hydroxyethyl) - 2 - n - octylamino - 2 - imidazolinium chloride was refluxed with 23.8 parts of thionyl chloride in the presence of 147 parts of chloroform for three hours. The residue from this reaction after removal of the solvent was refluxed for three hours in 232 parts of 0.23 molar absolute ethanolic potassium hydroxide solution. After the precipitated potassium chloride was removed by filtration, the filtrate was taken to dryness. 1-n-octyl-2,3,5,6-tetrahydro-1-imidaz (1,2-a) imidazole (B. P. 115–117° C./0.05 mm.) gave on analysis 70.07% carbon, 11.16% hydrogen and 18.52% nitrogen as compared with the calculated for $C_{13}H_{25}N_3$ of 69.90% carbon, 11.29% hydrogen and 18.81% nitrogen. Its picrate (M. P. 75–76° C.) on analysis gave 50.48% carbon, 6.14% hydrogen and 18.37% nitrogen compared with the theoretical calculated for $C_{19}H_{28}N_6O_7$ of 50.43% carbon, 6.24% hydrogen and 18.57% nitrogen.

EXAMPLE IX

*1-n-dodecyl-2,3,5,6-tetrahydro-1-imidaz (1,2-a) imidazole*

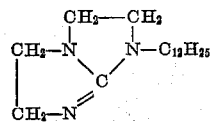

1 - (β - hydroxyethyl) - 2 - n - dodecylamino - 2 - imidazolinium chloride (66.7 parts) was refluxed for three hours with 35.7 parts of thionyl chloride in 147 parts of chloroform. The resulting chloro compound was refluxed with 400 parts by volume of a 0.312 molar absolute ethanolic solution of potassium hydroxide. The precipitated potassium chloride was removed by filtration and the filtrate was taken to dryness. The residue was extracted with ether and this ethereal extract on evaporation gave the crude oily product. This product (B. P. 143–145° C./0.08 mm.) was distilled in vacuo. It gave on analysis 73.00% carbon, 11.58% hydrogen and 14.83% nitrogen compared with the theoretical calculated for $C_{17}H_{33}N_3$ of 73.05% carbon, 11.95% hydrogen and 15.04% nitrogen. Its picrate (M. P. 65–66° C.) on analysis gave 54.50% carbon, 7.35% hydrogen and 16.69% nitrogen compared with the calculated for $C_{23}H_{36}N_6O_7$ of 54.30% carbon, 7.13% hydrogen and 16.52% nitrogen.

EXAMPLE X

*1-n-tetradecyl-2,3,5,6-tetrahydro-1-imidaz (1,2-a) imidazole*

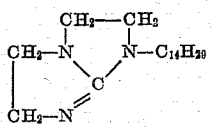

Sixty-five parts of 1-(β-hydroxyethyl)-2-n-tetra-decylamino)-2-imidazoline, was converted into its hydrochloride and the hydrochloride was refluxed for two hours with 47.6 parts of thionyl chloride in the presence of 200 parts of benzene. After the solvent and excess thionyl chloride were removed in vacuo, the residue was refluxed with 425 parts of 0.44 molar absolute ethanolic solution of potassium hydroxide for three hours. After the potassium chloride was removed by filtration the filtrate was evaporated to dryness. The residue was extracted with ether (400 parts) and the ethereal solution was taken to dryness. The black oily residue (82.4% yield) on distillation gave a colorless oil (B. P. 172–173° C./0.08 mm.). This new compound on analysis gave 74.43% carbon, 11.68% hydrogen and 13.69% nitrogen compared with the calculated for $C_{19}H_{37}N_3$ of 74.21% carbon, 12.13% hydrogen and 13.67% nitrogen. Its picrate (M. P. 75–76° C.), which was prepared in the usual manner, gave on analysis 56.16% carbon, 7.58% hydrogen and 15.56% nitrogen compared with the calculated for $C_{25}H_{40}N_6O_7$ of 55.94% carbon, 7.51% hydrogen and 15.86% nitrogen.

EXAMPLE XI

*1-n-hexadecyl-2,3,5,6-tetrahydro-1-imidaz (1,2-a) imidazole*

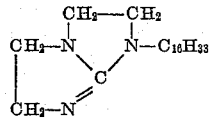

1 - (β - hydroxyethyl) - 2 - (n-hexadecylamino) - 2-imidazoline (42.3 parts) was refluxed for two hours with 41.7 parts of thionyl chloride in the presence of benzene. After the excess of thionyl chloride and solvent were removed by evaporation, the residue was refluxed in 230 parts of 0.25 molar absolute ethanolic solution of potassium hydroxide for three hours. The precipitated potassium chloride was removed by filtration and the filtrate was taken to dryness. This residue was extracted with ether (400 parts) and the ether solution was evaporated to dryness, yield 27.4 parts (67.7% overall yield). This oil was fractionally distilled under reduced pressure. The purified 1-n-hexadecyl-2,3,5,6-tetrahydro - 1 - imidaz (1,2-a) imidazole (B. P. 188–190° C./0.07 mm.; M. P. 33–34° C.) on analysis gave 75.01; carbon, 12.34% hydrogen and 12.35% nitrogen compared with the theoretical calculated for $C_{21}H_{41}N_3$ of 75.16% carbon, 12.34% hydrogen and 12.52% nitrogen. Its picrate (M. P. 78–79° C.) on analysis gave 57.53% carbon, 7.87% hydrogen and 14.60% nitrogen compared with the calculated for $C_{27}H_{44}N_6O_7$ of 57.42% carbon, 7.85% hydrogen and 14.88% nitrogen.

EXAMPLE XII

*1-n-octadecyl-2,3,5,6-tetrahydro-1-imidaz (1,2-a) imidazole*

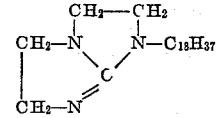

1 - (β - hydroxyethyl) - 2 - (n-octadecylamino) - 2-imidazoline (36 parts) was converted into its hydrochloride which was refluxed for three hours with 23.8 parts of thionyl chloride in 100 parts of benzene. After removal of the excess thionyl chloride and benzene solution in vacuo, the residue was refluxed for three hours in 250 parts of 0.25 molar absolute ethanolic solution of potassium hydroxide. The precipitated potassium chloride was filtered off and the filtrate was taken to dryness. This residue was extracted with ether (400 parts) and the ethereal solution was taken to dryness, yield 20 parts or 60% overall yield. This crystalline residue of 1-n-octadecyl-2,3,5,6-tetrahydro-1-imidaz (1,2-a) imidazole was purified by distillation in vacuo (B. P. 227–228° C./0.2 mm.; M. P. 36–37° C.). This new compound on analysis gave 75.81% carbon, 12.38% hydrogen and 11.61% nitrogen compared with the theoretical calculated for $C_{23}H_{45}N_3$ of 75.97% carbon, 12.48% hydrogen and 11.56% nitrogen. Its picrate (M. P. 86–87° C.) on analysis gave 58.83% carbon, 8.15% hydrogen and 14.01% nitrogen compared with the calculated for $C_{29}H_{48}N_6O_7$ of 58.78% carbon, 8.16% hydrogen and 14.15% nitrogen.

We claim:

1. 1 - substituted - 2,3,5,6 - tetrahydro - 1 - imidaz (1,2-a) imidazoles of the general formula

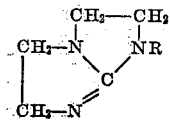

wherein R is a radical selected from the group consisting of an alkyl radical having from 10 to 20 carbon atoms.

2. A 1 - alkyl - 2,3,5,6 - tetrahydro - 1 - imidaz (1,2-a) imidazole, wherein the alkyl radical has from 10 to 20 carbon atoms.

3. 1 - n - dodecyl - 2,3,5,6 - tetrahydro - 1 - imidaz (1,2-a) imidazole.

4. 1 - n - tetradecyl - 2,3,5,6 - tetrahydro - 1 - imidaz (1,2-a) imidazole.

5. 1 - n - hexadecyl - 2,3,5,6 - tetrahydro - 1 - imidaz (1,2-a) imidazole.

6. 1 - n - octadecyl - 2,3,5,6 - tetrahydro - 1 - imidaz (1,2-a) imidazole.

7. A method for preparing a 1 - alkyl - 2,3,5,6-tetrahydro-1-imidaz (1,2-a) imidazole of the formula

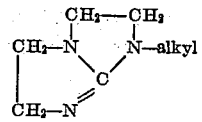

wherein the alkyl radical has from 10 to 20 carbon atoms comprising refluxing a 1-(β-hydroxyethyl)-2-alkylamino-2-imidazoline with thionyl chloride and refluxing the 1-(β-chloroethyl) - 2 - alkylamino-imidazolinium chloride obtained with an alcoholic solution of an alkali metal hydroxide.

No references cited.